June 17, 1930.  F. W. STEERE  1,764,992
GAS GENERATOR
Filed April 7, 1923  4 Sheets-Sheet 2
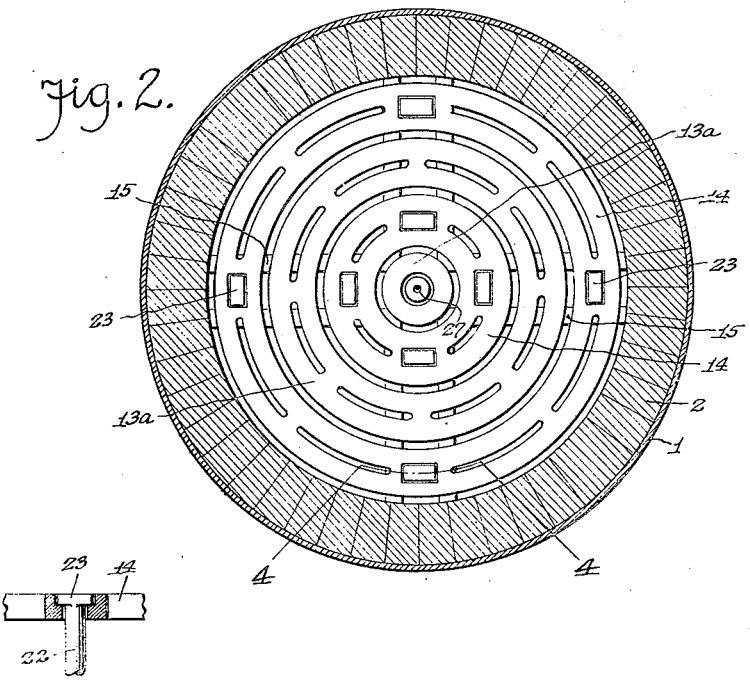
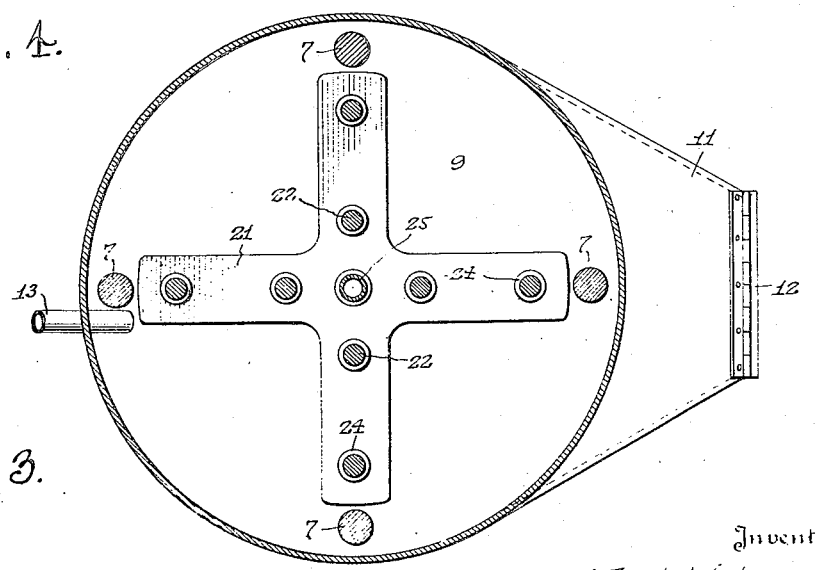
Inventor
Frank W. Steere.
By
Attorneys

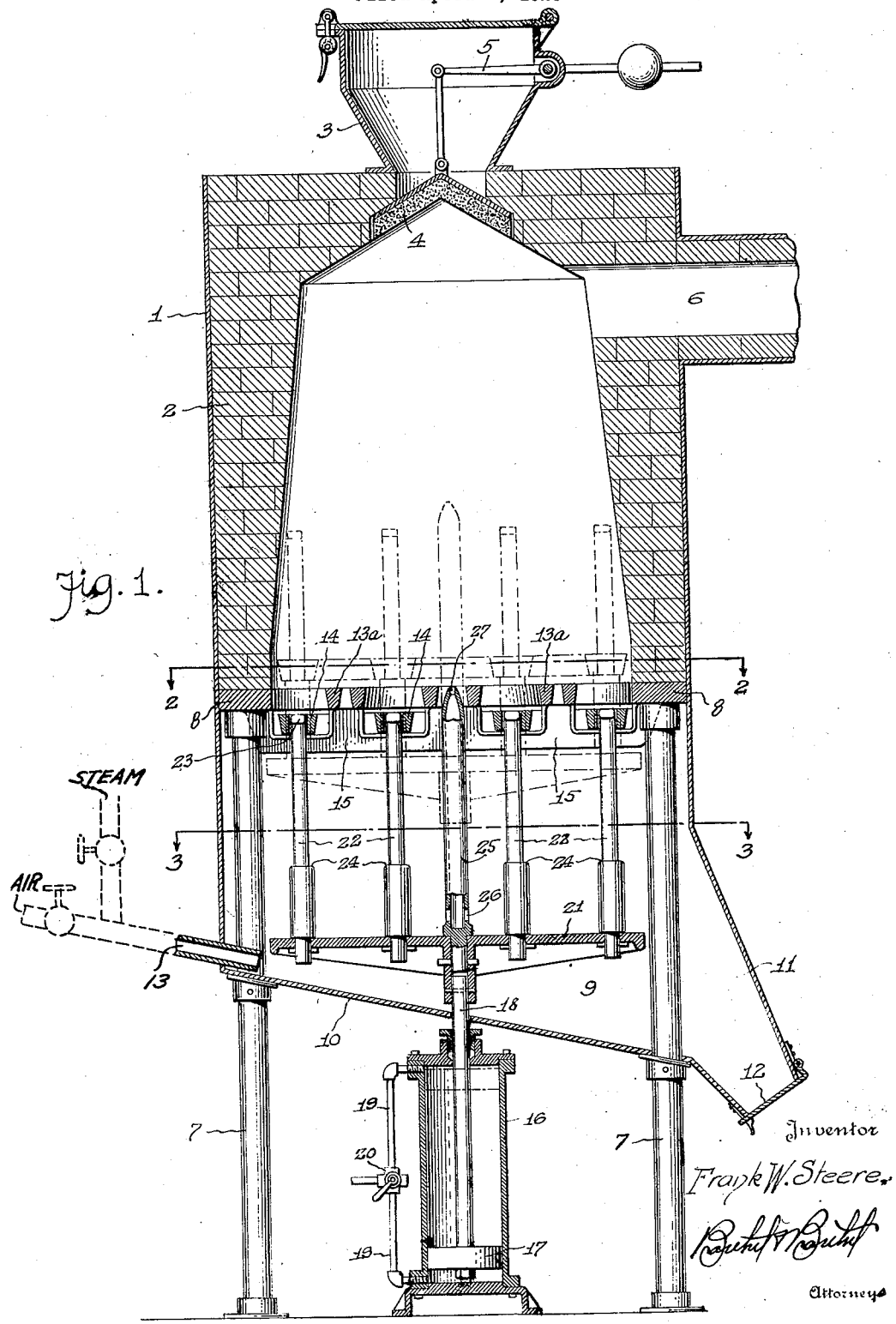

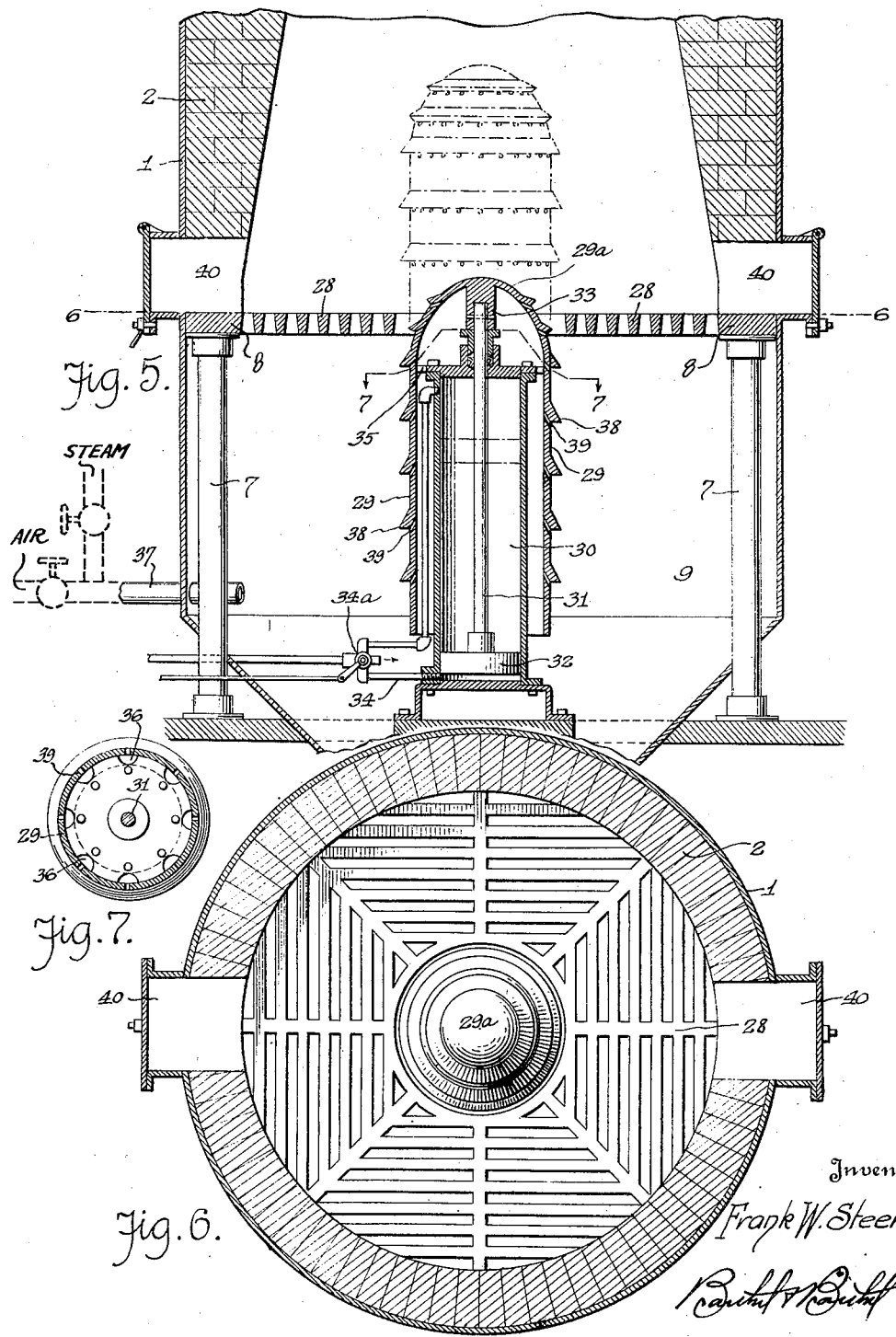

June 17, 1930.  F. W. STEERE  1,764,992
GAS GENERATOR
Filed April 7, 1923    4 Sheets-Sheet 4

Inventor
Frank W. Steere,

Attorneys

Patented June 17, 1930

1,764,992

UNITED STATES PATENT OFFICE

FRANK W. STEERE, OF DETROIT, MICHIGAN, ASSIGNOR TO SEMET-SOLVAY ENGINEERING CORPORATION, OF NEW YORK, N. Y., A CORPORATION OF NEW YORK

GAS GENERATOR

Application filed April 7, 1923. Serial No. 630,676.

This invention relates to a gas generating apparatus for the production of a combustible gas having a gas generating chamber provided with an ash and clinker removing device. Although there is shown and described herein as an embodiment of my invention, a water gas generator, it will be understood that the invention is not limited to water gas generators, but relates to other gas generating apparatus such as that used for the manufacture of producer gas.

The clinker formation in the fuel bed of gas generators as ordinarily operated causes holes or paths in the bed, impairing the density and uniformity of the fuel bed and permitting the passage of air and/or steam through the bed without proper reaction with the fuel of the fuel bed. Further, the formation of clinkers and the difficulty of removing such clinkers from the fuel bed usually necessitate the periodic discontinuance of the operation of the generators. This clinker formation with its aforesaid disadvantages prevails particularly in water gas generators where blasts of air and steam are alternately forced through the fuel bed.

Due to the extreme heat generated within the fuel chamber of the generator, it has been found difficult to maintain within this chamber, means for automatically breaking up and removing clinkers. Accordingly, it has been the usual practice to provide openings in the top or sides of the generators for the insertion of hand operated pokers by means of which clinkers are broken up and removed. Such operation is arduous and requires the discontinuance of the gas making operation. Moreover, it is practically impossible by such intermittent methods to maintain the fuel bed at the proper uniform density for best results.

One object of the present invention is to provide a mechanism that is simple in operation which will automatically break up the clinker and remove it, together with the ash, from the fuel bed, thereby permitting the maintenance of a uniform density of the fuel bed and the continuous uninterrupted operation of the gas generator. A further object is to regulate the gas production by introducing air and/or steam directly into the central portion of the fuel bed by means projectable into said bed and withdrawable therefrom into a zone of comparatively low temperature, thereby preventing destruction of said means by the high temperatures in the fuel chamber.

Other objects and advantages will appear from the following detailed description taken in connection with the accompanying drawings in which Fig. 1 is a vertical section through a water gas generator, a poker device being shown in elevation, and illustrating a preferred embodiment of my invention.

Fig. 2 is a horizontal section substantially upon the line 2—2 of Fig. 1;

Fig. 3 is a similar horizontal section, substantially upon the line 3—3 of Fig. 1;

Fig. 4 is a horizontal sectional detail of a grate member and its operating poker member;

Fig. 5 is a transverse vertical section through the lower end portion of a water gas generator and showing a modified construction of poking or agitating means;

Fig. 6 is a horizontal section through Fig. 5 substantially upon the line 6—6;

Fig. 7 is a sectional detail of the poker member, substantially upon the line 7—7 of Fig. 5;

Figure 8:
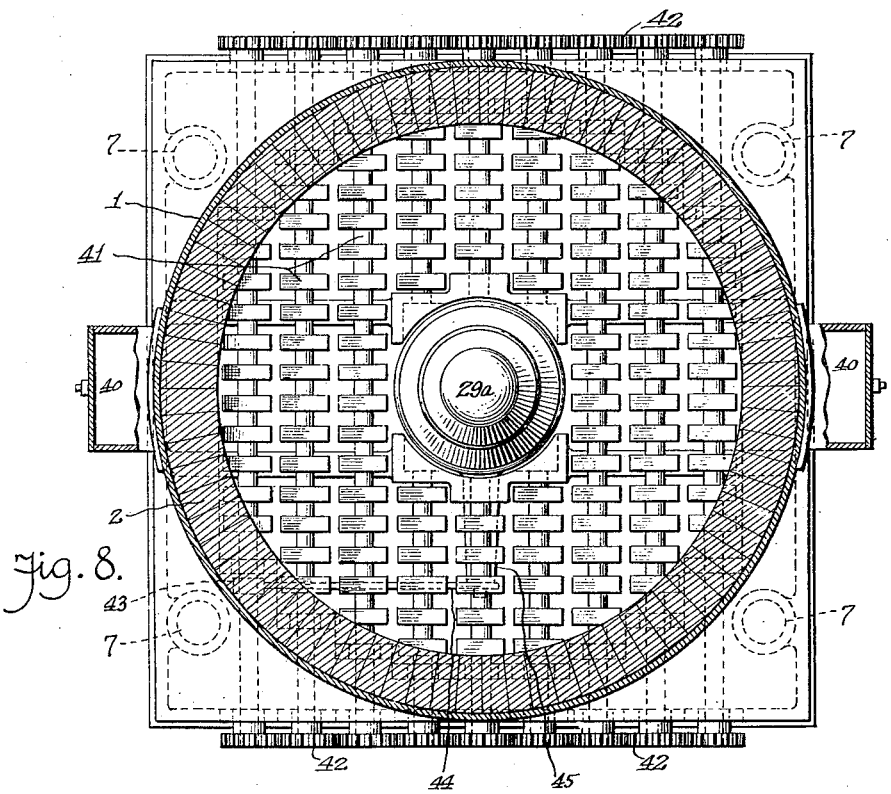
Fig. 8 is a horizontal section substantially upon the line 8—8 of Fig. 9.

In the drawings, is shown a water gas generator, the fire chamber or retort of which comprises an outer, preferably circular shell 1 which is lined with fire brick 2, the interior surface of the fire brick wall being tapered downwardly from its upper end to assist the downward movement of the fuel in the chamber and prevent fusing of the fuel to the surface of the wall. The top of the generator is provided with the usual feed hopper 3, the discharge lower end of which opens into the upper end of the retort and is closed by a suitable closure member 4 which is operated in any suitable manner as by a lever 5. The gas generated within the chamber is carried off through a suitable outlet 6 at the upper end of the chamber. The generator structure is supported in any suitable manner as by posts 7 upon the upper ends of which is mounted a metal ring 8 forming a seat or base for the brick work 2. Within this ring is a suitable grate structure for supporting the bed of fuel within the chamber. The shell 1 is preferably extended downwardly for a distance below the plane of the grate to form an air-tight ash pit 9, the shell being provided with an inclined bottom 10 and a laterally extending ash chute 11 which is tightly closed by a door 12. Alternate blasts of air (under pressure) and steam are periodically introduced into the ash pit 9 through a pipe 13 and forced into the fuel bed to blow the bed to incandescence during the air blasting period and to produce combustible water gas by the action of the steam on the incandescent bed during the gas making period. It will be noted that pipe 13 is directed towards the ash chute 11 so that the incoming air and steam tends to direct the ash and clinker falling through the grate into the ash pit, laterally into the ash chute 11.

In Figs. 1 to 3 inclusive, the grate structure is shown as comprising a series of alternately arranged, fixed and movable rings, the fixed rings or ring as the case may be, being indicated by the numeral 13ª, and the movable rings by the numerals 14. These several rings are carried by a suitable supporting structure or framework indicated by the numeral 15, this supporting structure serving to support the fixed grate members in fixed position, and to permit of a vertical up and down movement of the movable members 14, said supporting structure being cut away to permit the movable members to fall below the plane of the fixed members through the spaces between said fixed members, the supporting structure limiting such downward movement of these movable members.

Supported upon a suitable base below the ash pit 10, is a cylinder 16, the vertical axis of which is in the vertical plane of the vertical axis of the incandescent fuel chamber of the generator, and within this cylinder is a piston 17 having a piston rod 18 extending vertically upward through the bottom of the ash pit. Suitable pipe connections 19 are fitted to the upper and lower ends of the cylinder, and the inlet of fluid under pressure to the cylinder through these connections, is controlled by a valve 20 so that the piston may be caused to reciprocate within the cylinder by the operation of said valve. Secured to the upper end of the piston rod 18 within the ash pit, is a spider 21, and attached to the arms of this spider is a plurality of rods or pokers 22 adapted to extend upwardly through openings in the movable grate members 14 and to be projected vertically upward through these openings by the upward movement of the spider 21 caused by the movement of the piston 17 in the cylinder 16. Each of these pokers or rods 22 has a head 23 on its upper end to engage the movable grate members. Each poker or rod is also formed with a shoulder 24 near its lower end adapted to engage the underside of the several movable grate members and lift these grate members upon the upward movement of the spider 21, the movement of the spider being sufficient to raise the movable grate members above the plane of the fixed grate members as indicated in dotted lines in Fig. 1. Upon downward movement of the spider from its fully raised position, the pokers or rods 22 will be retracted from their upwardly projected position within the fuel bed, downwardly through the movable grate members, until the head 23 of the pokers come into contact with the movable grate bars and will then pull these bars downwardly below the plane of the fixed bars to their seats upon the supporting structure 15.

Actuation of the piston within the cylinder therefore raises and lowers the spider 21 and projects the several pokers upwardly into the fuel bed and retracts them therefrom, simultaneously moving the movable grate members to cause the ash and small clinkers to fall through the grate into the ash pit. The projection of the pokers into the fuel bed actuates this fuel bed sufficiently to break up the clinkers and cause an even distribution of the fuel and a uniform density of the fuel bed. This prevents the formation of holes or paths in the fuel bed through which the air and steam under pressure admitted to the ash pit may pass up through the fuel bed without being properly converted during such passage.

Soft coal has heretofore been found somewhat unsuitable for use as a water gas generator fuel, for it has a tendency when subjected to generator temperatures toward mass formation or melting together, necessitating very high steam and air pressure to force the air and steam through the fuel bed. Further, the blasts of air and steam, due to its tendency to follow the path of least resistance through the fuel bed will pass through the bed without proper conversion into gas unless the fuel bed is of relatively uniform density.

With the present arrangement of pokers which are projected upwardly into the fuel bed from the bottom thereof, and which may be operated whenever it is desirable, the fuel bed is agitated sufficiently to give an even distribution of fuel and to produce a bed of uniform density. At the same time, these pokers break up the clinker and assist in the prevention of clinker formation, so that holes or paths will not be formed in the fuel bed and the air and steam under pressure will pass evenly therethrough, which is a desideratum in the operation of gas generators.

As shown in Figs. 1 to 3 inclusive, a central or axial poker member 25 is preferably formed hollow or tubular and provided with openings 26 near its lower end through which the steam and air under pressure within the ash pit may enter this tubular member and escape through a discharge opening 27 at its upper end. One or more of these pokers may be of this tubular form, and when the pokers are projected upwardly into the fuel bed, air and steam under pressure will be introduced directly into the fuel bed through this tubular poker. Such introduction of air and steam directly into the fuel bed greatly assists in gas production, and as the pokers may be projected or retracted as desired and to the desired extent, the fuel bed may be maintained in the proper condition to give the best results, and the proper amount of air and steam may be introduced into that part of the fuel bed which will be most advantageous in the production of the desired quality and quantity of gas.

By means of this poker and movable grate arrangement, the formation of clinker in the fuel bed is held to a minimum and the formed clinker is broken up and this clinker together with the ash is automatically removed from the bottom of the fuel bed. As all of this mechanism for removing the clinker and ash is located below the fuel bed and fire chamber, it is within a zone which is maintained at a comparatively low temperature, and as the parts are further cooled by the ingoing air and steam, disintegration of the parts, due to extreme temperatures is prevented. Further, where the poker or pokers are formed hollow and steam and air are passed therethrough, they are prevented from burning out when projected into the fuel bed.

In Figs. 5 to 7 inclusive a modified form of poker or agitator is shown. In this construction a single centrally located poker is shown although a plurality of such pokers may be employed and this poker is preferably of a relatively large diameter in relation to 28 which may be a fixed or stationary grate as shown.

The single centrally located poker or agitator 29 is preferably in the form of a cast shell having a closed and rounded upper end or nose 29ª and being open at its lower end. In order that this device may be installed in water gas generators as commonly constructed, the cylinder 30 is located within the shell or poker 29 and therefore the device is shortened in its overall length so that it may be placed within the space usually provided in gas generators beneath the fuel supporting grate. The piston rod 31 of the piston 32 is secured at 33 to the closed upper end 30 of the poker 29, and therefore when the shell or poker 29 is in lowered position, it is sleeved over the cylinder 30. When steam and air under pressure are admitted to the cylinder 30, through the connection 34, by operating the valve 34ª, the piston is moved in the cylinder and when moved upwardly, carries the poker vertically upward through a central opening in the grate 28 and projects it into the fuel bed. This shell is guided by the cylinder 30, said cylinder being formed with a flange 35 at its upper end to engage the inner surface of the wall of the shell, said flange being notched as at 36 along its edge to permit steam and air under pressure admitted to the ash pit through the pipe 37, upon entering the open lower end of the shell to pass upwardly therein past the flange 35. The shell is preferably formed with a series of external annular ribs 38, and adjacent the lower edge of each rib is a series of small holes or openings 39 through which the air and steam may pass from within the shell into the fuel bed.

When the poker member or shell 29 is projected upwardly into the fuel bed supported upon the grate 28, due to the comparatively large diameter of this poker, the whole fuel bed will be agitated and the fuel forced radially in all directions toward the side walls of the producer, thus thoroughly agitating the fuel bed to break up any clinker which has formed, and to force the broken clinker and ash laterally across the grate toward cleanout or discharge openings 40 formed in the wall of the generator adjacent the grate, and thus the clinker and ash will be automatically moved toward and through these openings and eliminated from the fuel bed. As the poker or shell 29 is always in free communication with the ash pit beneath the grate, the air and steam pressure maintained within this ash pit is free at all times to enter the shell of the poker and will discharge through the openings 39 into the fuel bed when the poker is projected upwardly.

Figure 9:
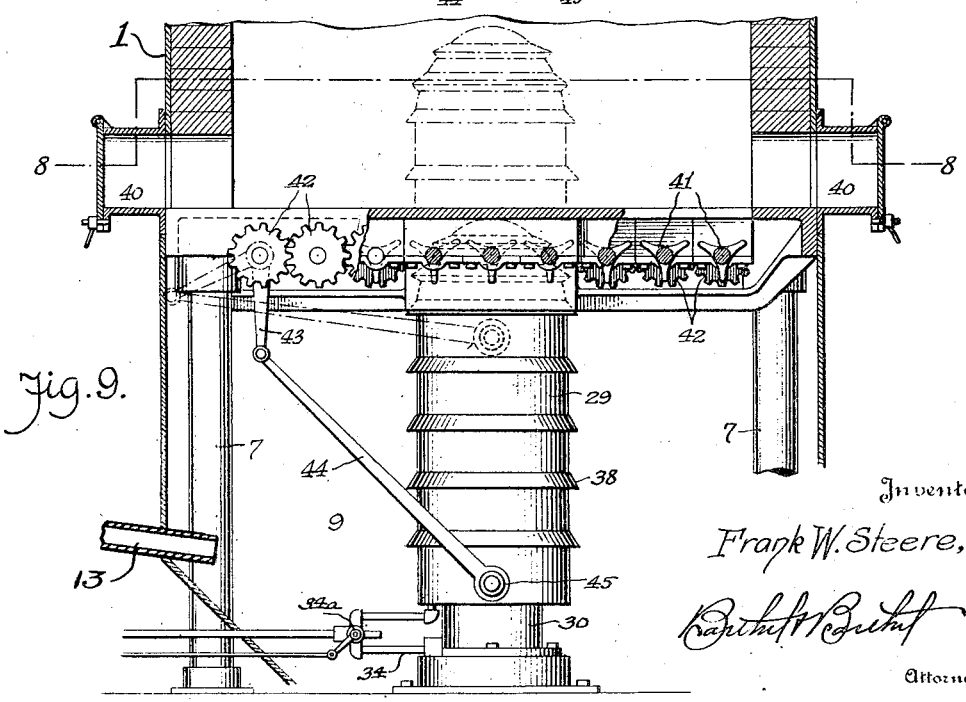
Fig. 9 is a transverse vertical section through the lower part of a gas generator, showing a modified grate construction, and means for operating the same.

As shown in Figs. 8 and 9, a grate formed of a series of rotatable bars 41 may be employed, these grate members being toothed in the usual manner, to form clinker grinders and geared together by intermeshing gears 42 on the outer ends of their shafts so that adjacent bars may be rocked or turned in opposite directions to crush and grind clinkers caught between them, and to eliminate the crushed clinkers and ash from the bottom of the fuel bed. Any suitable mechanism may be employed for rotating or rocking the movable grate members, but preferably motion is imparted to the bars through mechanism operated by the up and down movement of the poker 29 as by providing an arm 43 on one of the bars and connecting this arm with the poker 29 by means of a link 44 pivotally attached at one end to the arm and at its opposite end to a stud 45 projecting laterally from said poker. Up and down movement of the poker imparts a swinging movement to the arm and thus rocks the several grate bars simultaneously with the operation of the poker.

When in the specification and claims reference is made to the introduction of "steam and air" into the poker member or into the fuel bed it will be understood that the steam and air are not necessarily introduced at one and the same time but that air and/or steam may be introduced depending on the particular method employed for operating the gas generator and on the particular type of combustible gas which it is desired to make.

It will be understood that while specific embodiments of the invention have been shown and described, various changes in the details thereof may be made by those skilled in the art and the invention is not to be limited to the structures disclosed, but only by the scope of the appended claims.

What I claim is:—

1. In a water gas generating apparatus, a gas generating chamber containing a fuel bed, means for introducing air and steam to maintain combustion and produce a combustible gas, and means projectable into the fuel bed in direct contact with said bed and retractable therefrom during the production of the combustible gas, said latter means being arranged to discharge said air and steam directly into the fuel bed above the base portion thereof.

2. In combination with an apparatus for producing water gas, a gas chamber containing a fuel bed for generating the gas, means for supplying air and steam to the fuel bed in the chamber to produce a combustible gas, a hollow member projectable during the production of the combustible gas into the hot zone of the fuel bed in direct contact with the fuel of said bed and adapted to receive said air and steam and discharge the same into said zone, said member being retractable from the fuel bed into a zone of lower temperature, and means for projecting and retracting said member.

3. In a combustible gas generating apparatus, a gas generating chamber containing a fuel bed for generating combustible gas, a grate for the fuel bed, means projectable during the production of the combustible gas through the grate and into the fuel bed in direct contact with the fuel of said bed, and retractable therefrom, and means for admitting air and steam through said projectable means into the fuel bed.

4. In a combustible gas generating apparatus, a gas generating chamber containing a fuel bed for generating combustible gas, a grate for the fuel bed, vertically movable means for poking said bed projectable through the grate and into the fuel bed in direct contact with the fuel of said bed and retractable therefrom and operative during the production of the combustible gas, means for admitting air through said projectable means into the fuel bed and a cylinder for operating said vertically movable means.

5. In a gas generating apparatus, a gas generating chamber containing a fuel bed, means for supplying steam to the fuel bed to produce a combustible gas, a grate for the fuel bed and a hollow poker member positioned below said grate and adapted to be moved during the production of the combustible gas through the grate into the fuel bed in direct contact with the fuel of said bed.

6. In a gas generating apparatus, a gas generating chamber containing a fuel bed means for supplying steam to the fuel bed to produce a combustible gas, a grate for the fuel bed, a hollow poker member, having openings therein, the major portion of which is normally positioned below said grate, and means for vertically reciprocating said poker member during the production of the combustible gas through the grate and into direct contact with the fuel of said bed and from the fuel bed.

7. In combination with an apparatus for producing water gas, a closed gas generating chamber containing a fuel bed for generating the gas, a closed ash pit beneath said chamber, means for supplying air and steam under pressure to said pit for passage through the fuel bed to produce a combustible gas, a hollow poker member opening at its lower portion into said ash pit and having the major portion thereof normally positioned within said pit, means for projecting and retracting said poker member during the production of the combustible gas into and from the fuel bed, and means for supplying steam and air under pressure to said hollow member.

8. In combination with an apparatus for producing water gas and including a gas chamber containing a fuel bed for generating the gas, means for supplying air and steam under pressure to pass through the fuel bed in said chamber, a poker member positioned vertically below said fuel bed with its upper end portion within the fuel bed and projectable upwardly into said fuel bed and retractable therefrom during the production of the gas, and means for operating said member, including a cylinder and a piston in said cylinder operatively connected to said member.

9. In combination with a water gas generating apparatus including a gas generating chamber containing a fuel bed for generating the gas, a grate for supporting the bed, a closed ash pit beneath the grate, means for supplying air and steam under pressure to said pit, a poker member positioned below said grate within said closed chamber centrally thereof and of said gas generating chamber, and means for operating said member to project the same upwardly through the grate into the fuel bed thereon centrally thereof and to retract the same during the generation of the gas.

10. In combination with a water gas generating apparatus including a gas generating chamber containing a fuel bed for generating the gas, a grate forming the bottom of said chamber and including movable members, a closed ash pit below said grate, and means for supplying air and steam under pressure to said ash pit to pass through the fuel bed on the grate and produce a combustible gas, a poker member in said ash pit and projectable and retractable through said grate into and from the bed of fuel thereon, means operatively connected with said poker member for operating the same, and means for operating the movable grate members actuated by said poker.

11. In combination with a water gas generating apparatus including a gas generating chamber containing a fuel bed for generating the gas, a grate forming the bottom of said chamber and including movable members, a closed ash pit below said grate, means for supplying air and steam under pressure to said ash pit to pass through the fuel bed and produce combustible gas, a poker member in said ash pit below said grate and arranged in a vertical position to be projected upwardly through the grate into the fuel bed and retractable therefrom, fluid pressure operated means operatively connected with said poker member for operating the same, and means operated by said poker member for operating said movable grate members.

12. In combination with a water gas generating apparatus including a gas generating chamber containing a fuel bed for generating the gas, means for supplying air and steam under pressure to pass upwardly through said bed of fuel and produce a combustible gas, a poker member comprising a hollow shell positioned with its longitudinal axis extending vertically, said shell being open at its lower end, and means for projecting said shell upwardly into the fuel bed and including a cylinder over which said shell is sleeved, said cylinder forming a guide for said shell, and a piston in said cylinder operatively connected with said shell to project and retract the same.

13. A water gas generating apparatus as characterized in claim 12 wherein said shell is formed with a plurality of openings in its upper end and side for the introduction of air and steam into the fuel bed when said shell is in projected position.

14. In combination with a water gas generating apparatus including a gas generating chamber containing a fuel bed for generating gas, a movable grate comprising a series of rotatable bars, means for supplying air and steam under pressure to pass upwardly through said bed of fuel and produce a combustible gas, a poker member comprising a hollow shell positioned with its longitudinal axis extending vertically, means for projecting said shell upwardly into the fuel bed and means for connecting said projecting means with said movable grate, whereby movement of the shell imparts movement to the grate.

15. In combination with a water gas generating apparatus including a gas generating chamber containing a fuel bed for generating the gas, a grate comprising a series of rotatable bars having an opening disposed in the central portion thereof, intermeshing gears on the rotatable bars, a poker member comprising a hollow shell with openings therein positioned with its longitudinal axis extending vertically, and means for supplying air and steam under pressure to said shell, means for projecting said shell through said opening into the fuel bed and means connecting said shell with said gears whereby movement of said shell imparts movement to the rotatable bars.

16. In combination with an apparatus for producing combustible gas, a grate comprising a plurality of members disposed to provide a central opening, a poker member positioned below said opening, and means to move said poker member through said opening and simultaneously oscillate said members.

17. In combination with an apparatus for producing combustible gas, a grate comprising a plurality of members disposed longitudinally in parallel relation, said members being spaced from each other and adapted to provide a central opening, a single poker member positioned below said opening, and means to move said poker member through said opening during the production of the combustible gas.

18. In combination with an apparatus for producing combustible gas, a grate arranged to support a fuel bed, said grate comprising a plurality of members disposed longitudinally in parallel relation, said members being spaced from each other and disposed to provide an opening, a poker member positioned below said opening, and means to move said poker member through said opening into said fuel bed and retract it from said fuel bed during the production of the combustible gas.

19. In a combustible gas generating apparatus, a gas generating chamber, a movable sectional grate for supporting a bed of fuel in said chamber, a poker member adapted to be projected through the grate into the fuel bed and retracted from the fuel bed during the gas-making operation, means for moving said poker member into and retracting it from said fuel bed, and means for moving the grate sections to remove ash and clinkers from said fuel bed.

In testimony whereof I affix my signature.

FRANK W. STEERE.